United States Patent [19]

Hervé

[11] Patent Number: 4,573,004
[45] Date of Patent: Feb. 25, 1986

[54] VARIABLE ELECTRICAL ENERGY STABILIZER

[76] Inventor: Marcel Hervé, 55, rue Lacordaire, 75015 Paris, France

[21] Appl. No.: 459,266

[22] Filed: Jan. 19, 1983

[30] Foreign Application Priority Data

Feb. 11, 1982 [FR] France ................. 82 02263

[51] Int. Cl.$^4$ ................... G05F 3/14; H02M 7/08
[52] U.S. Cl. ............................... 320/51; 320/57; 333/181; 363/45; 363/170
[58] Field of Search ............... 322/35; 320/61, 57, 320/59, 51, 21; 363/45–47, 75, 76, 82, 90, 140, 170, 173; 333/181

[56] References Cited

U.S. PATENT DOCUMENTS

| | | | |
|---|---|---|---|
| 1,571,458 | 2/1926 | Pupin | 333/181 X |
| 2,214,773 | 9/1940 | Overbeck | 333/181 X |
| 2,930,962 | 3/1960 | Weil | 363/76 |
| 3,978,388 | 8/1976 | de Vries | 363/45 |

FOREIGN PATENT DOCUMENTS 431590 7/1975 U.S.S.R. ................. 320/21

*Primary Examiner*—Robert J. Hickey
*Attorney, Agent, or Firm*—Lowe, King, Price & Becker

[57] ABSTRACT

A variable electrical energy stabilizer is supplied with a source having a voltage magnitude that varies to maintain a constant ratio with the pulsation frequency of the source. The variable supply is derived from a variable energy source such as a kinetic energy accumulator which is intended for feeding a telephone exchange or an electrical unit on a sealed off site. The stabilizer supplies a d.c. output current to a load having a predetermined impedance. To provide the load with continuous energy with a constant amplitude via solely passive components, the stabilizer comprises an inductive circuit having an inductance substantially equal to the quotient of the constant ratio to the amplitude of the output current. The inductance circuit has a very high impedance compared to the load impedance.

21 Claims, 5 Drawing Figures

VARIABLE ELECTRICAL ENERGY STABILIZER

BACKGROUND OF THE INVENTION

1. Field of the Invention

The present invention relates to a variable electrical energy stabilizer driven by a pulsation energy source having voltage amplitude varying in a constant ratio with the pulsation frequency, for supplying a d.c. output current to a load having a predetermined impedance.

2. Description of the Prior Art

Generally speaking, the input energy for a load stabilizer comes from a variable energy source, such as a variable voltage generator of the variable speed alternator type or a wind or solar generator. The input energy can also be delivered from an energy storage device; in particular, reference is made hereinafter to a reversible kinetic energy accumulator (KEA) which stores kinetic energy in a rotor whilst the rotor is driven by an alternating electrical generator. Should there be a failure in the main circuit normally feeding the electrical generator, the reversible feature of the kinetic energy accumulator enables it to function as an electrical generator, thus providing a certain lapse of time for supplying and triggering a stand-by electrical generator. Such kinetic energy accumulators are intended for supplying, for instance, a telephone exchange or an electrical unit at a sealed off site, e.g., a radio relay or station.

In a telephone exchange, the kinetic energy accumulator thus replaces the traditional electrochemical accumulators delivering a d.c. voltage of around 48 to 50 Volts. Means must be connected to the output of the kinetic energy accumulator for the purpose of stabilizing the electrical energy delivered from the kinetic energy accumulator. When the main circuit initially fails the kinetic energy accumulator is rotating at a high speed imparted to it by the associated alternating electrical generator. As the failure continues the kinetic energy of the accumulator is reduced, causing the voltage applied by the accumulator to a load to progressively drop. The dropping voltage is constantly proportional to the decreasing rotation speed of the accumulator rotor. The voltage applied to the load therefore varies in frequency and amplitude so much so that kinetic energy accumulator installations have generally included stabilizers which transform the variable frequency and amplitude voltage into a continuous energy. To provide the best possible efficiency the stabilizers usually derive a constant amplitude.

A known variable electrical energy stabilizer comprises a rectifier for rectifying the a.c. voltage that is supplied by the kinetic energy accumulator, and a continuous-continuous chopping voltage converter for stabilizing the rectifier voltage. The drawback, however, in this solution resides in the implementation of electronic circuits which comprise a large number of components, thereby diminishing the reliability of the stabilizer and generating steep-side currents that give rise to electromagnetic disturbances likely to perturb telephone signal transmission.

OBJECTS OF THE INVENTION

The main object of this invention is to provide a variable electrical energy stabilizer that is straightforward and inexpensive.

Another object of this invention is to provide a variable electrical energy stabilizer having only passive components for converting a variable frequency and amplitude voltage into a d.c. output current having a constant amplitude.

SUMMARY OF THE INVENTION

In accordance with the aforementioned objects, a variable electrical energy stabilizer comprises an inductive means having inductance substantially equal to the value of a constant ratio between the voltage amplitude and frequency of an input source divided by the amplitude of the output current restored from the stabilizer; the impedance of the inductive means is very high compared to the load impedance.

The stabilizer embodying the invention relies on the following principle. If $\omega$ and $E$, respectively, the variable pulsation frequency of the voltage input signal and the variable amplitude of the voltage which is delivered by a variable generator, such as a kinetic energy accumulator, are related by a constant ratio k, i.e., $k = E/\omega$, a constant direct current i flows through an inductance L across the generator terminals if:

$$E = Li\omega,$$

where
 $\omega = 2\pi F$, and
 $F$ = the frequency derived by the generator. This means:

$$i = \frac{E}{L\omega} = \frac{k\omega}{L\omega} \text{ and } L = \frac{k}{i}$$

The foregoing expressions are not modified in practice when a load is series-connected with the inductance and has a negligible impedance compared to that of the inductance.

BRIEF DESCRIPTION OF THE DRAWING

Other objects, advantages and features of this invention will become apparent by reading the following detailed description of preferred embodiments of the invention with reference to the corresponding accompanying drawings in which.

DESCRIPTION OF THE PREFERRED EMBODIMENTS

Figure 1:
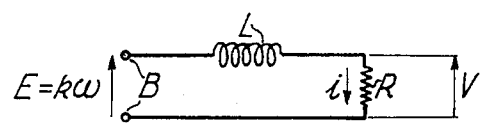
FIG. 1 is a circuit diagram of a stabilizer for a monophase input according to one embodiment of the invention.

With reference to FIG. 1, consideration is given to the simple case of a variable voltage input $E = k\omega$ applied across input terminals B of a monophase variable electrical energy stabilizer. The stabilizer comprises at least one inductive circuit that is made up of a simple inductor L. The output load, shown here as a resistor R, is series-connected with the inductor L between the two terminals B.

The stabilizer output current which flows through the load R is expressed by the following relationship:

$$i = e/(L^2\omega^2 + R^2)^{\frac{1}{2}};$$

since,
$E = k\omega$ $$i = k\omega/(L^2\omega^2 + R^2)^{\frac{1}{2}}$$

Figure 2:
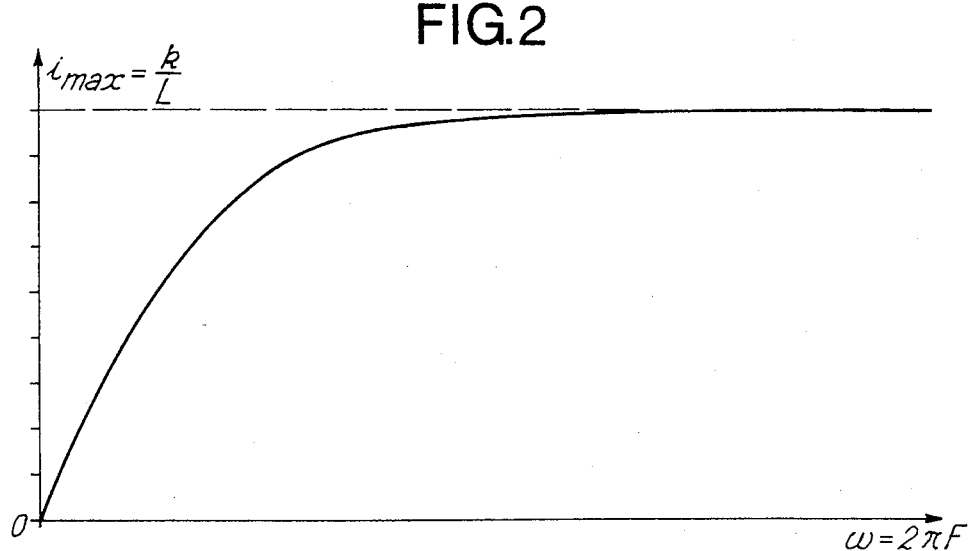
FIG. 2 is a diagram illustrating the variation in current flowing through the load versus the input signal pulsation frequency for a predetermined inductance of the stabilizer and a predetermined load.

For $\omega L >> R$, the variation in the current i in terms of the pulsation frequency $\omega$ is represented by the curve given in FIG. 2. As is evident from FIG. 2, as $\omega$ approaches infinity the curve of FIG. 2 is asymptotic for the maximum current $i_{max}$ such that:

$$i_{max} = k/L.$$

The current i can be considered as being practically constant when the frequency increases so the current is in a range between $i_{max}$ and $(i_{max} - 10\% \ i_{max}) = 0.9 i_{max} = i_{min}$. For a pulsation frequency less than the $\omega_{min}$ value corresponding to $i_{min}$, the current supplied by the variable voltage input to terminals B is regarded as unusable as far as the load R is concerned. In other words, the impedance of the inductor L must be chosen such that $L\omega > R$, over the usable current range.

To provide a better understanding, indicated hereinafter are the numerical values for the practical case of the stabilizer linked to the output B of a kinetic energy accumulator acting as an accumulator battery for a telephone exchange. The accummumulator can rotate at speeds up to 12000 rpm, which corresponds to a voltage source having a frequency F=1200 Hz and an amplitude E=256 Volts. The constant $k = E/(2\pi F)$ is then equal to $34 \times 10^{-3}$. In keeping with the stipulations relative to a telephone exchange, the voltage V across the load R terminals must equal 50 Volts and the current $i_{max}$ flowing through the load R must equal 20 A. From the earlier expressions and numerical values, the following are deduced:

load $R = V/i_{max} = 50/20 = 2.5\Omega$;
inductance $L = k/i_{max} = 34 \times 10^{-3}/20 = 1.7 \times 10^{-3}$H;
current $i_{min} = 90\% \ i_{max} = 18$ A; and
corresponding pulsation:

$$\omega_{min} = \frac{R \cdot i_{min}}{(k^2 - i_{min}^2 L^2)^{1/2}} =$$

$$\frac{2.5 \times 18}{(34^2 \times 10^{-6} - 18^2 \times (1.7)^2 \times 10^{-6})^{1/2}}$$

i.e., $\omega_{min} \simeq 3000$ radians/sec and $F_{min} = 480$ Hz.

Consequently, for frequencies of the voltage supplied to terminals B greater than $F_{min}$, which is relatively low and corresponds to the kinetic accumulator being almost at rest, the current can be considered as being constant. The sole limit on the stabilizer is conditioned by $R >> L\omega$, i.e., $2.5 < L\omega_{min} = 5.1$.

Figure 3:
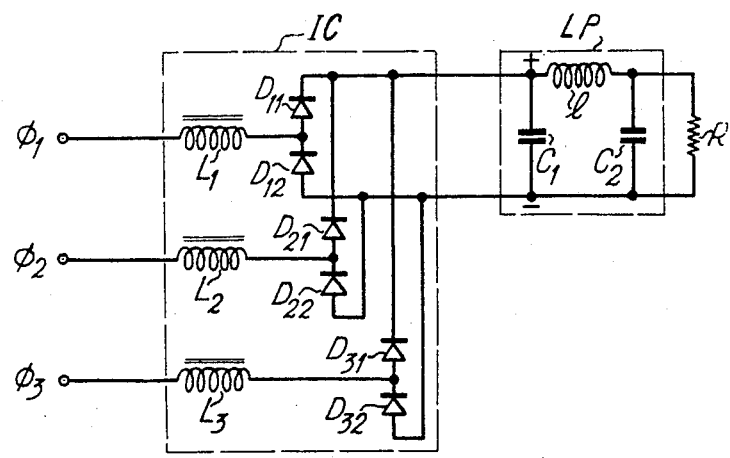
FIG. 3 is a block-diagram of a stabilizer for a triphase input.

Generally speaking, the input signal applied on the stabilizer is multiphased, and in particular is triphased (3-phase). FIG. 3 is a circuit diagram of a variable electrical energy stabilizer having three 3-phase inputs $\phi_1$, $\phi_2$, $\phi_3$ responsive to the three monophase inputs of a triphase input supplied by the kinetic energy accumulator. An inductive circuit IC of the stabilizer comprises three elementary inductive circuits for each of the monophase signals respectively. Each elementary inductive circuit includes an inductor $L_1$, $L_2$, $L_3$ and two diodes $D_{11}$, $D_{12}$; $D_{21}$, $D_{22}$; $D_{31}$, $D_{32}$. The six diodes form a Graetz bridge to switch the three phases in sequence. In each elementary inductive circuit, each of inductors $L_1$, $L_2$, $L_3$ has one terminal respectively connected to each of inputs $\phi_1$, $\phi_2$, $\phi_3$; the other terminal of each of inductors $L_1$, $L_2$, $L_3$ is respectively connected to the common terminal of two respective diodes $D_{11}$, $D_{12}$; $D_{21}$, $D_{22}$; $D_{31}$, $D_{32}$. The two diodes are series-connected and are forward-biased from a negative terminal (−) of the load R to a positive terminal (+) of the load R. The three inductors $L_1$, $L_2$, $L_3$ are identical and can be formed of three identical windings, each wound on a laminated iron core having an air-gap.

Provisions can be made for a low pass filter LP between the terminals of the three parallel series of diodes $D_{11}$, $D_{12}$; $D_{21}$, $D_{22}$; and $D_{31}$, $D_{32}$ and the load R terminals to suppress the upper harmonics from the kinetic energy accumulator. The filter LP can be configured with $\pi$- connections. The two shunt branches of each of filters LP between the terminals common to the three series of diodes and between the load terminals respectively include capacitors $C_1$ and $C_2$. The series branch of filter LP comprises an inductance l.

Figure 4:
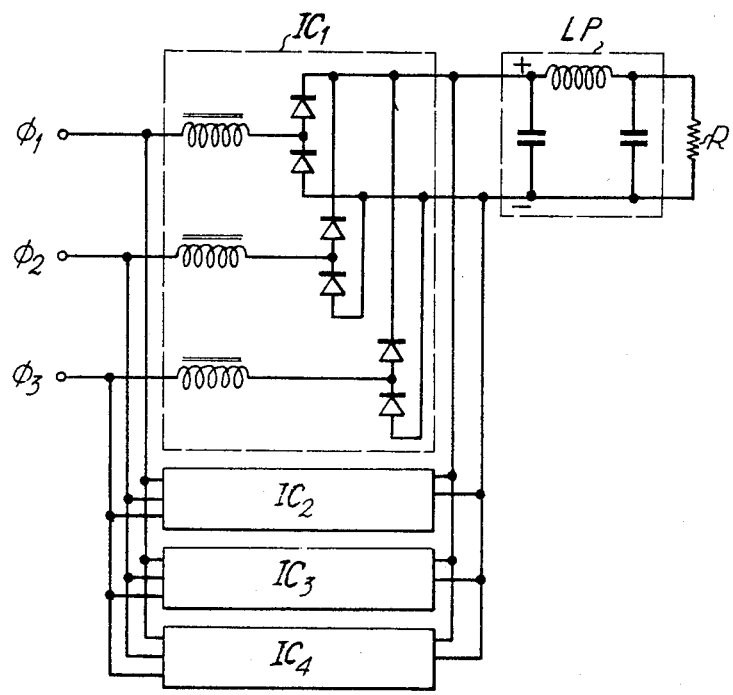
FIG. 4 is a block-diagram of a stabilizer for a triphase input, comprising four inductive means connected in parallel.

To obviate excessively high current values in the inductors $L_1$, $L_2$ and $L_3$, several inductive circuits IC having an identical structure to that depicted in FIG. 3 can be connected in parallel between the monophase inputs $\phi_1$, $\phi_2$ and $\phi_3$ and the terminals of the first capacitor $C_1$ of low pass filter LP. In FIG. 4 is illustrated such a stabilizer which comprises four parallel inductive circuits $IC_1$ to $IC_4$ that are analogous to the inductive circuit IC shown in FIG. 3.

Figure 5:
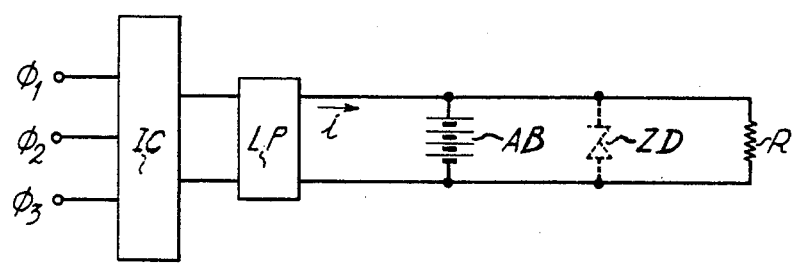
FIG. 5 is a block-diagram of a stabilizer used as a d.c. voltage and d.c. current source.

The variable electrical energy stabilizer embodying the invention can be used as a constant-voltage source under a constant-current, notably when the impedance value of the load R is subject to variations. With reference to FIG. 5, connected in parallel with the load R terminals and between the output terminals of low pass LP filter is an accumulator battery AB, typically having a low capacity. The variations in the voltage at the load terminals which result from the load impedance variations are absorbed by the battery AB; the extra current charges the battery AB.

As shown in FIG. 5, the constant voltage can be additionally ensured by a Zener diode ZD connected in parallel with the load R.

What I claim is:

1. A variable electrical energy stabilizer connected to terminals of a variable monophase voltage supply means for supplying a d.c. current to a load having an impedance, said variable monophase voltage amplitude varying with a constant ratio with a variable pulsation rate per unit time, said stabilizer comprising an inductive means series-connected with said load between said supply means terminals, said inductive means having an inductance substantially equal to the quotient of said constant ratio to the amplitude of said d.c. current and having an impedance very high compared to the impedance of said load.

2. A variable electrical energy stabilizer connected to terminals of a variable multiphase voltage supply means for deriving a d.c. current flowing through a load having an impedance, said variable multiphase voltage having a magnitude varying with a constant ratio with a variable pulsation rate per unit time, said stabilizer comprising: inductive means respectively assigned to monophase voltages making up said multiphase voltage, each of said inductive means comprising:

an inductor having one terminal connected to one of said supply means terminals supplied by said respective monophase voltage, said inductor having an inductance substantially equal to the quotient of said constant ratio to the amplitude of said d.c. current and having an impedance very high compared to the impedance of said load, and two series-connected diodes having a common terminal connected to another terminal of said inductor and two other terminals respectively connected to cause supply current to flow through opposite terminals of said load.

3. A variable electrical energy stabilizer as claimed in claim 1 wherein the inductive means includes several inductive elements connected in parallel with each other.

4. A variable electrical energy stabilizer as claimed in claim 1 further comprising a low pass filter between said inductive means and said load.

5. A variable electrical energy stabilizer as claimed in claim 1 further comprising an accumulator battery connected in parallel with said load to be responsive to current from said inductive means.

6. A variable electrical energy stabilizer as claimed in claim 1 further comprising a Zener diode connected in parallel with said load.

7. A variable electrical energy stabilizer as claimed in claim 1 further comprising a low pass filter connected between said inductive means and said load, an accumulator battery connected in parallel with said load, and a Zener diode connected in parallel with said load.

8. A variable electrical energy stabilizer as claimed in claim 2 wherein the inductive means includes several inductive elements connected in parallel with each other.

9. A variable electrical energy stabilizer as claimed in claim 2 further comprising a low pass filter between said inductive means and said load.

10. A variable electrical energy stabilizer as claimed in claim 2 further comprising an accumulator battery connected in parallel with said load to be responsive to current from said inductive means.

11. A variable electrical energy stabilizer as claimed in claim 2 further comprising a Zener diode connected in parallel with said load.

12. A variable electrical energy stabilizer as claimed in claim 2 further comprising a low pass filter connected between inductive means and said load, an accumulator battery connected in parallel with said load, and a Zener diode connected in parallel with said load.

13. A circuit for maintaining a constant voltage across a load having an impedance value R, the circuit being driven by a source having a variable pulsating frequency, $\omega$, related to a variable amplitude, E, in accordance with $E = k\omega$, where k is a constant, the circuit comprising inductive circuit means series-connected between the source and load, the circuit means having an inductance value $$L = k/i_{max},$$

where
$\omega L >> R$, and
$i_{max}$ = current supplied by the source to the load and the inductive circuit means as the pulsating frequency approaches infinity.

14. In combination with a load, a source having a variable pulsating frequency, $\omega$, related to a variable amplitude, E, in accordance with $E = k\omega$, where k is a constant, inductive circuit means series-connected between the source and load, the circuit means having an inductance value $$L = k/i_{max},$$

where
$\omega L >> R$, and
$i_{max}$ = current supplied by the source to the load and the inductive circuit means as the pulsating frequency approaches infinity.

15. The combination of claim 14 wherein the source minimum frequency is the frequency causing the current supplied by the source to the load and inductive circuit means to be $0.9 i_{max}$.

16. The combination of claim 14 wherein the source is a single phase source.

17. The combination of claim 14 wherein the source is a multi-phase source, a separate one of said inductive circuit means being provided for each phase of the source, and rectifier means for converting current flowing through the circuit means for each phase of the source into d.c. current coupled to the load.

18. The combination of claim 17 further including low pass filter means connected between the rectifier means and the load.

19. The combination of claim 17 wherein the rectifier means for each phase includes full wave rectifier means comprising first and second oppositely poled diodes respectively connected in series with first and second terminals of the load, both of said diodes being connected in series with a terminal of the inductive circuit means.

20. The circuit of claim 13 wherein the source is a multi-phase source, a separate one of said inductive circuit means being provided for each phase of the source, and rectifier means for converting current flowing through the circuit means for each phase of the source into d.c. current coupled to the load.

21. The circuit combination of claim 14 wherein the source comprises a kinetic energy accumulator driven by an electric generator fed by a circuit main subject to failure.

* * * * *